(12) United States Patent
Lv et al.

(10) Patent No.: US 8,472,718 B2
(45) Date of Patent: Jun. 25, 2013

(54) SUPERPIXEL SEGMENTATION METHODS AND SYSTEMS

(75) Inventors: Xutao Lv, Columbia, MO (US); Su Wang, San Jose, CA (US); Shengyang Dai, San Jose, CA (US); Xun Xu, Palo Alto, CA (US); Akira Nakamura, San Jose, CA (US)

(73) Assignee: Sony Corporation, Tokyo (JP)

( * ) Notice: Subject to any disclaimer, the term of this patent is extended or adjusted under 35 U.S.C. 154(b) by 117 days.

(21) Appl. No.: 13/204,574

(22) Filed: Aug. 5, 2011

(65) Prior Publication Data

US 2012/0275703 A1    Nov. 1, 2012

Related U.S. Application Data

(60) Provisional application No. 61/479,746, filed on Apr. 27, 2011.

(51) Int. Cl.
   *G06K 9/34*   (2006.01)
   *G06K 9/00*   (2006.01)
(52) U.S. Cl.
   USPC ....................................................... 382/173
(58) Field of Classification Search
   USPC ... 382/131, 168, 171, 173, 254; 345/419–420
   See application file for complete search history.

(56) References Cited

U.S. PATENT DOCUMENTS

| 6,591,004 | B1 * | 7/2003 | VanEssen et al. | 382/154 |
| 7,136,082 | B2 * | 11/2006 | Saund et al. | 345/619 |
| 7,212,665 | B2 * | 5/2007 | Yang et al | 382/159 |
| 7,558,417 | B2 * | 7/2009 | Knoplioch et al. | 382/131 |
| 8,265,390 | B2 * | 9/2012 | Dube et al. | 382/168 |
| 2008/0137989 | A1 | 6/2008 | Ng et al. | |
| 2009/0067709 | A1 | 3/2009 | Gross et al. | |
| 2011/0050703 | A1 | 3/2011 | Artan et al. | |
| 2012/0275703 | A1 * | 11/2012 | Lv et al. | 382/173 |

OTHER PUBLICATIONS

Fulkerson et al. "Class Segmentation and Object Localization with Superpixel Neighborhoods", International Conference on Computer vision, 2009, [retrievel on Jul. 5, 2012]. Retrieved from the Internet: <URL: http://www.vision.cs.ucla.edu/papers/fulkersonVS09.pdf>, pp. 1-8.

* cited by examiner

*Primary Examiner* — Amir Alavi
(74) *Attorney, Agent, or Firm* — Haverstock & Owens LLP

(57) ABSTRACT

Systems and methods for implementing a superpixel image segmentation technique using a boundary preserving distance metric are disclosed. The disclosed technique segments a digital image into superpixels comprising contiguous pixel regions sharing similar characteristics. Superpixel image segmentation techniques presented herein utilize a boundary preserving distance metric. A boundary preserving distance metric presented herein measures the similarity between two pixels of a digital image at least partially based on a boundary probability values of the two pixels and surrounding pixels.

15 Claims, 6 Drawing Sheets

A

B

C

D

SUPERPIXEL SEGMENTATION METHODS AND SYSTEMS

RELATED APPLICATION

This application claims the benefit of priority under 35 U.S.C. §119(e) of U.S. Provisional Application No. 61/479,746, filed Apr. 27, 2011, the disclosure of which is incorporated herein by reference.

TECHNICAL FIELD

The present disclosure relates to systems and methods for segmenting digital image data.

BACKGROUND

Superpixel image segmentation techniques have been recognized as useful for segmenting digitized images into discrete pixel clusters to aid and enhance further image analysis. The discrete pixel clusters, called superpixels, represent contiguous groups of digital image pixels sharing similar characteristics, such as color, texture, intensity, etc. Because the superpixels of a segmented image represent clusters of pixels sharing similar characteristics, further image processing tasks may be carried out on the superpixels themselves, rather than individual pixels. Thus, superpixel segmentation serves to lower the memory and processing requirements for various image processing tasks, which in turn may permit either greater throughput or more in-depth image analysis. Tasks that may benefit from superpixel segmentation include feature extraction, object recognition, pose estimation, and scene classification tasks.

Conventional superpixel segmentation techniques are not well suited to process images that have a high texture content. Image texture is a function of spatial variation in image pixel intensity. Highly textured images are notable in that the colors are not highly varied, but variations in pixel intensity produce well-defined images. Cloth, tree bark, and grass are examples of highly textured images.

Highly textured images are quite common, and it is therefore desirable to provide a superpixel segmentation method that is capable of generating an accurate superpixel segmentation of a textured image. It is also desirable to provide a superpixel segmentation method that is computationally efficient, and able to produce compact superpixel segmentations. A compact superpixel segmentation is one in which the superpixel size is kept as uniform as possible, and the total number of superpixels remains small.

SUMMARY

Methods and systems are disclosed herein for superpixel segmentation of digital images. In one embodiment consistent with the disclosure, a computer-implemented image analysis method for generating a superpixel segmentation of a digitized image to be performed by a system comprising at least one processor and at least one memory comprises determining by the system a probabilistic boundary map of the digitized image, calculating by the system a boundary preserving distance metric between at least one of a plurality of pixels of the digitized image and a neighboring plurality of pixels surrounding the at least one of the plurality of pixels, segmenting by the system the plurality of pixels based on the calculated boundary preserving distance metric, generating by the system a plurality of superpixels based on the segmented plurality of pixels, and outputting by the system the generated superpixels for performing additional digital analysis.

In another embodiment, the computer-implemented image analysis method further comprises performing by the system a connected component analysis of the segments of the digitized image using the boundary preserving distance metric, and merging by the system neighboring segments based on results of the connected component analysis.

In still another embodiment, the performing a connected component analysis further comprises computing a composite boundary preserving distance metric between a candidate segment and at least one perimeter point in at least one neighboring segment. The composite boundary preserving distance metric may be a minimum of the boundary preserving distance metrics computed between at least one pixel of the candidate segment and the at least one perimeter point. The neighboring segment to be merged may contain a maximum number of pixels having a minimum composite boundary preserving distance metric. Merging neighboring segments further comprises determining whether a strong boundary exists between the candidate segment and the neighboring segment to be merged, and merging the candidate segment and the neighboring segment to be merged if no strong boundary exists between the candidate segment and the neighboring segment to be merged.

In still another embodiment, the boundary preserving distance metric is determined based on a Euclidean distance, a Bhattacharyya distance, and a boundary crossing probability between two pixels.

In still another embodiment, the Bhattarachya distance between two pixels based is measured on an adaptive region size determination.

In still another embodiment, segmenting the plurality of pixels further comprises using a quick shift image segmentation algorithm with the boundary preserving distance metric.

In still another embodiment, segmenting the plurality of pixels further comprises smoothing the boundaries of the segmented plurality of pixels, and splitting the segmented plurality of pixels.

BRIEF DESCRIPTION OF DRAWINGS

The accompanying drawings, which are incorporated in and constitute a part of this specification, together with the description, serve to explain the principles of the embodiments described herein.

DETAILED DESCRIPTION

Reference will now be made in detail to exemplary embodiments as illustrated in the accompanying drawings.

Wherever possible, the same reference numbers will be used throughout the drawings and the following description to refer to the same or like parts. These embodiments are described in sufficient detail to enable those skilled in the art to practice the invention and it is to be understood that other embodiments may be utilized and that changes may be made without departing from the scope of the present invention. The following detailed description, therefore, is not to be taken in a limited sense. The exemplary superpixel image segmentation techniques presented here may refer to specific examples for illustration purposes. It is understood that these image segmentation techniques are not limited to use with any particular class or type of digital images.

Exemplary systems and methods disclosed herein use a superpixel segmentation technique utilizing a boundary preserving distance metric. Superpixel segmentation techniques may serve to provide an initial digital image segmentation for use in further image processing analysis tasks. As used herein, superpixels represent contiguous groups of digital image pixels sharing similar characteristics, such as color, texture, intensity, etc. Superpixels may be characterized as disjoint collections of pixels sharing similar characteristics, such as color, texture, or intensity, and may cover all or part of a digital image. The boundaries of the superpixels may coincide with natural edges within a segmented digital image. The size and number of the superpixels used to segment an image is not fixed, and may be determined based on image characteristics and image analysis parameters.

Superpixels may be utilized to better place feature extraction regions, or may themselves be used as feature extraction regions. Disjoint superpixels may reduce feature extraction redundancy. Superpixels covering an entire image may reduce data gaps during the generation of image classification models. Superpixels comprising pixels sharing similar characteristics may improve the specificity of feature extraction. During a classification task, a digital image may be classified superpixel by superpixel, thus decreasing the time required for such a task.

As used herein, the terms "distance" and "distance metric" refer to a measured dissimilarity between two pixels. For instance, Euclidean distance represents a measurement of the dissimilarity in the position of two pixels. If the two pixels ate adjacent to each other, then the Euclidean distance between them is 1. Euclidean distance may be calculated by the standard method of using the Pythagorean theorem. Other distance metrics may also be used, such as an RGB distance which represents the dissimilarity between the color values of two pixels, or a Bhattacharyya distance which represents the dissimilarity between the neighborhoods surrounding two pixels.

Figure 1:
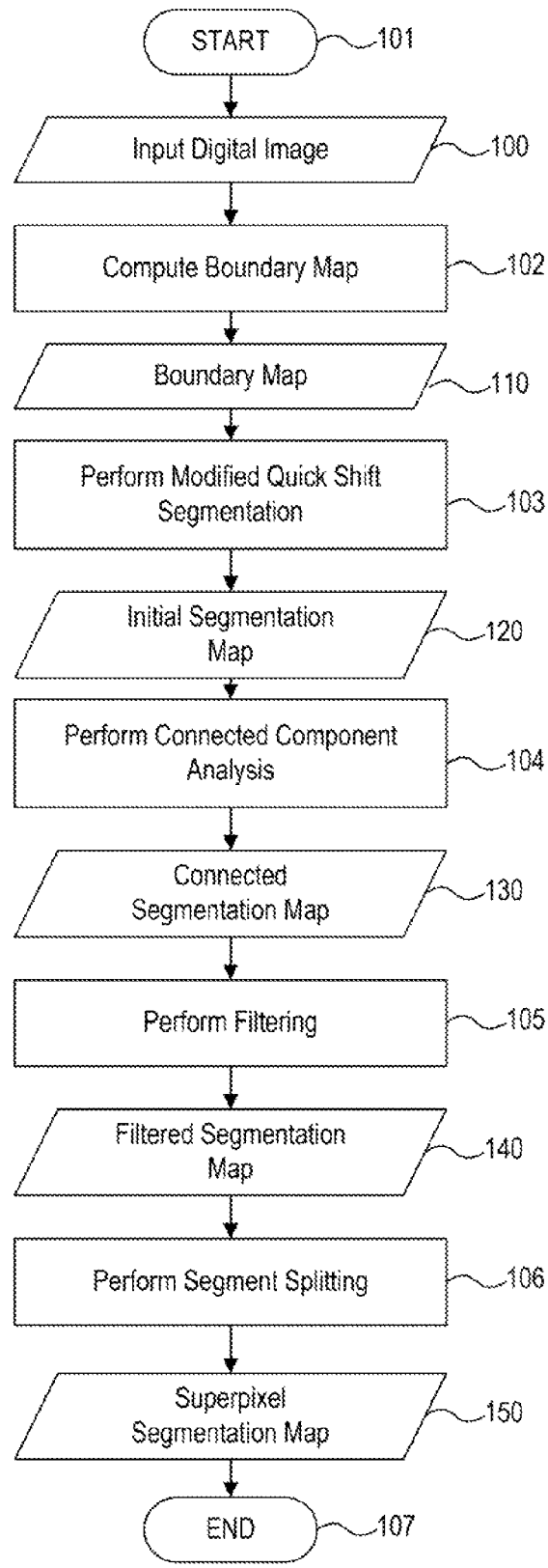
FIG. 1 is a flowchart showing the steps of an exemplary method for performing superpixel segmentation based on a boundary preserving distance metric.

FIG. 1 is a flowchart showing the steps of an exemplary method for performing superpixel segmentation based on a boundary preserving distance metric. The exemplary method receives digital image 100 as an input at step 101, and, after performing a superpixel segmentation, outputs a superpixel-segmented digital image at step 107.

At step 102, a boundary map 110 for input digital image 100 is computed. Boundary map 110 may be an array of boundary probability values corresponding to the pixels of input digital image 100. A boundary probability value represents the likelihood that its corresponding pixel represents an image boundary, for instance, the border of an object in the image. Boundary map 110 may contain, for example, a value of 1 to correspond to a pixel that is certain to represent an image boundary and a value of 0 to correspond to a pixel that is certain not to represent an image boundary. All boundary probability decimal values between 0 and 1 may therefore represent a graded likelihood that a corresponding pixel of digital image 100 represents an image boundary. Boundary map 110 may contain boundary probability values for all or some of the pixels of input digital image 100. Boundary map 110 may be generated by suitable image processing techniques.

At step 103, a modified quick shift algorithm using a distance preserving boundary metric is used to produce an initial segmentation map 120 of digital image 100. The boundary preserving distance metric, $d_{BP}$ may be computed using the following equation (1).

$$d_{BP}(x,y)=d_2(x,y)+\alpha d_B(x,y)+\beta d_{IC}(x,y) \quad (1)$$

In equation (1), x and y each represent individual pixels between which the distance metric $d_{BP}$ is to be computed. $d_2$ represents the standard Euclidean distance between the pixels within the image. $d_B$ represents the Bhattacharyya distance between two regions around pixels x and y. $d_{IC}$ is computed using an intervening contour method and represents the strongest probability that a boundary crosses between pixels x and y. Finally, $\alpha$ and $\beta$ represent normalization coefficients.

The standard Euclidean distance, $d_2$, may be calculated by determining the linear positional distance between pixels x and y within the image, for example, by using the Pythagorean theorem.

Figure 2:
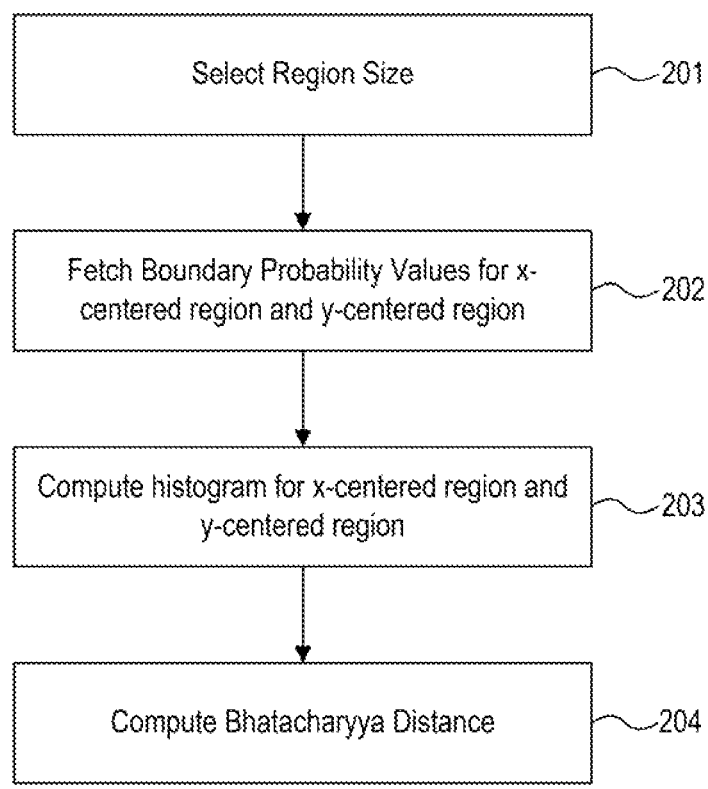
FIG. 2 is a flowchart showing the steps of an exemplary method for computing a Bhattacharyya distance between two pixels.

FIG. 2 is a flowchart showing the steps of an exemplary algorithm for calculating the Bhattacharyya distance between two pixels x and y. The Bhattacharyya distance, $d_B$, as used herein, may be computed based on regions of pixels surrounding x and y as follows. The distance $d_B$ between two pixels measures the dissimilarity of the boundary probabilities in the neighborhood of each pixel. Two pixels that have similar boundary probabilities in their surrounding pixels, e.g. because both pixels are far away from a boundary, should have a relatively low $d_B$. Two pixels that have different boundary probabilities in their surrounding pixels, e.g. because one pixel is near a boundary and the other is not, should have a relatively high $d_B$.

At step 201, an n×n pixel region size is selected. The region size may be selected based on a standardized region size to be used for all $d_B$ measurements, or may be adaptively determined for individual $d_B$ measurements using an adaptive region size determination method explained in more detail below. Alternatively, a circular, ellipsoid, or other suitably shaped pixel region may be chosen, using either a predetermined or adaptively determined region size.

At step 202, the boundary probability values for the n×n regions centered on pixel x and on pixel y are fetched from the boundary map for further computation. For example, a 3×3 pixel region size centered on pixel x includes 9 boundary probability values, including the boundary probability value of pixel x and the values of the 8 pixels immediately surrounding pixel x.

At step 203, histograms of the fetched boundary probability values for the pixels of both the x-centered region and the y-centered region are computed. The histograms are computed based on N bins, where N may be predetermined or dynamically determined. Pixels x and y may therefore be associated with histograms $H_x$ and $H_y$, which may be represented by vectors of N dimension. Histograms $H_x$ and $H_y$ represent a characterization of the boundary probabilities of the regions surrounding pixels x and y, respectively.

At step 204, the dissimilarity between the x-centered region and the y-centered region is measured by computing the Bhattacharyya distance between the respective histograms, using the following equation (2).

$$d_B(x, y) = -\ln\left(\sum_{i=1}^{N} \sqrt{H_x(i)H_y(i)}\right). \quad (2)$$

Figure 3A:
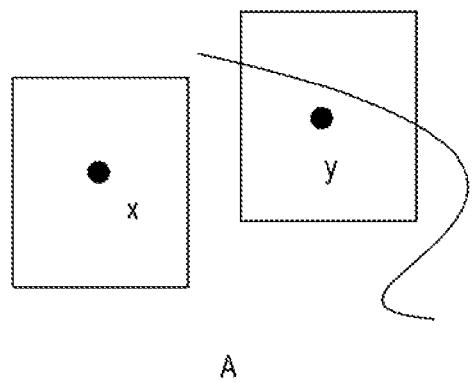
FIG. 3 illustrates an exemplary adaptive region size determination method for use in a Bhattacharyya distance computation.
Figure 3B:
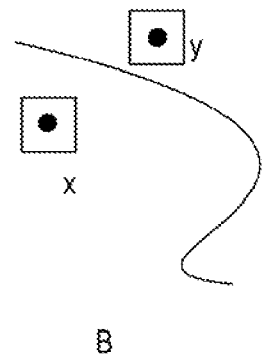

FIGS. 3A-D illustrate an adaptive region size determination method. As previously described, computing the Bhattacharyya distance between two pixels requires the determination of a surrounding region size. If region size is set to be inappropriately large, as shown in FIG. 3A, the distance $d_B$ between pixels x and y on the same side of a boundary may also be inappropriately large. The pixels shown in FIG. 3A should have a relatively low dB, because both pixels are on the same side of a boundary. The opposite is illustrated in FIG. 3B; if region size is set to be inappropriately small, the distance $d_B$ between pixels x and y on opposite sides of a boundary may also inappropriately small. The distance $d_B$ between the pixels of FIG. 3B should be relatively high, because the pixels are on opposite sides of a boundary.

Figure 3C:
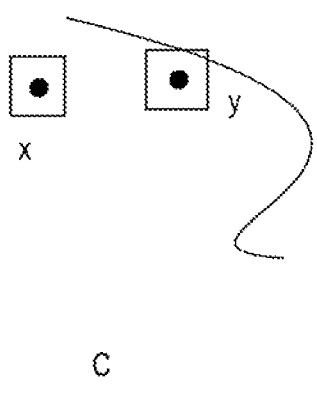
Figure 3D:
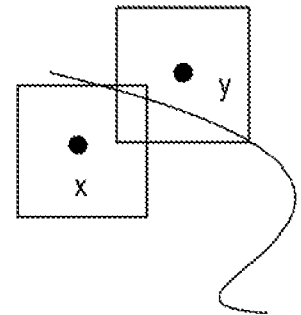

An exemplary adaptive region size determination method serves to select an appropriate n×n region from which to compute $d_B$. The region size may be selected using an adaptive region size determination method. In an exemplary adaptive method, the n×n region size is determined based on the Euclidean distances between pixels x and y and their nearest strong boundary. A strong boundary, as used herein, is a collection of pixels of the digitized image, each having a boundary probability value higher than a predetermined threshold value. In the exemplary adaptive region size determination method, if there is no strong boundary between pixels x and y, as shown in FIG. 3C, n is set as the minimum of the Euclidean distances between pixels x and y and their nearest strong boundary. In the exemplary adaptive region size determination method, if there is a strong boundary between pixels x and y, as shown in FIG. 3D, n is set as the maximum of the Euclidean distances between pixels x and y and their nearest strong boundary. The predetermined strong boundary threshold may be predetermined, or may be dynamically determined based on image characteristics.

Alternatively, the exemplary adaptive region size determination method may be modified to select regions that are not square-shaped, including, for example, circles or ellipsoids. In a circular adaptive region size determination method, for example, the selected n may represent the radius of a determined circular region.

Returning to FIG. 1, at step 103, boundary preserving distance metric equation (1) $d_{BP}(x,y)=d_2(x,y)+\alpha d_B(x,y)+\beta d_{IC}(x,y)$ will be further explained. $d_{IC}$ represents the strongest probability that a boundary crosses between pixels x and y. $d_{IC}$ may be determined by taking the highest probability value from the boundary map 110 found in the line of that corresponds to the pixels between pixels x and y.

The three terms of the boundary preserving distance metric $d_{BP}$ each contribute different dissimilarity information to $d_{BP}$. $d_2$ is a common measure of the positional distance between pixels x and y. $d_B$ is a measure of the dissimilarity of both strong and weak boundaries found in each pixel's surrounding neighborhood. Finally, $d_{IC}$ captures information about the strongest boundary that exists between pixels x and y.

The boundary preserving distance metric $d_{BP}$ may then be used at step 103 in a modified quick shift segmentation method to produce an initial segmentation map 120 of digital image 100.

Figure 4:
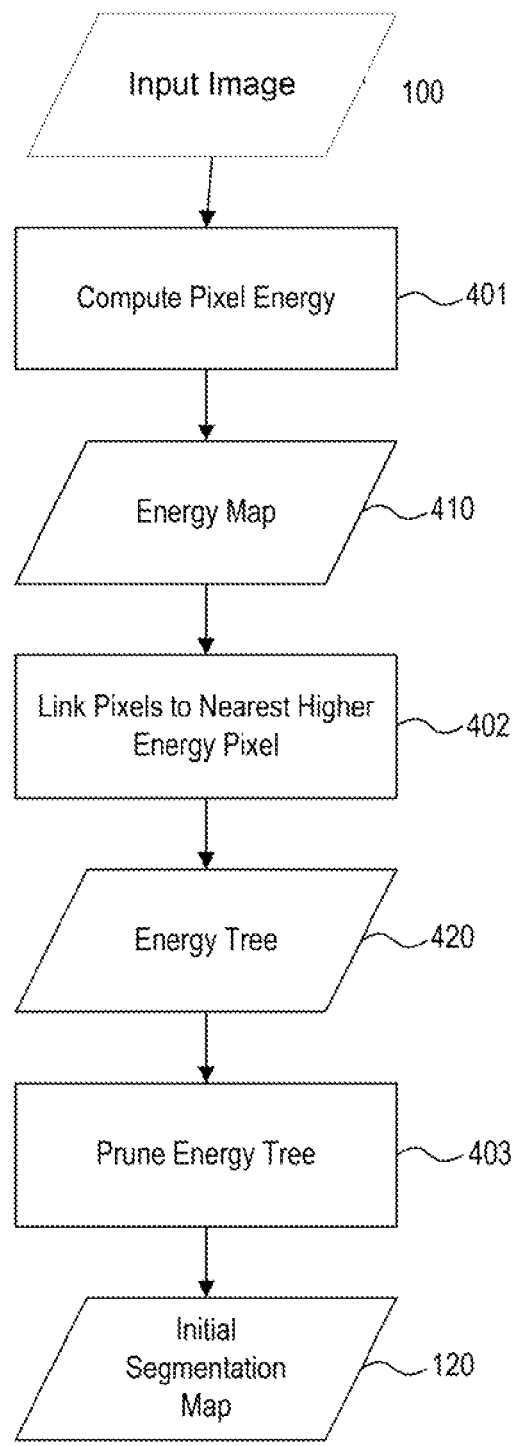
FIG. 4 is a flowchart showing the steps of an exemplary modified quick shift method using a boundary preserving distance metric for performing a pixel segmentation.

FIG. 4 is a flowchart showing the steps of an exemplary modified quick shift segmentation method performed with a boundary preserving distance metric $d_{BP}$. At step 401, the energy of all or some of the pixels of the input digital image 100 is computed. The energy of a pixel represents a composite measure of the boundary preserving distance of the pixel from the pixels in its neighborhood. One exemplary method of determining the energy of a pixel is as follows. The energy of a single pixel may be defined as the sum of the energy between that pixel and each of the pixels in its neighborhood. The energy between any two pixels a and b may be defined by equation (3).

$$e^{-d_{BP}(a,b)} \quad (3)$$

Two pixels having a small boundary preserving distance between them will have a high energy, whereas two pixels having a large boundary preserving distance between them will have a low energy. The total energy of any one pixel is the sum of the computed energy between that pixel and each of its neighbors. Thus, an individual pixel of high energy will tend to have small boundary preserving distances between itself and its neighbors. That is, pixels of high energy will tend to be relatively similar to their neighbors, as measured by boundary preserving distance metric $d_{BP}$. For the purposes of computing pixel energy, pixel neighborhood size may be predetermined or may be dynamically determined based on image characteristics. By computing the energy of all or some of the pixels of digital image 100, energy map 410 may be produced.

Energy map 410 may then be used, at step 402, to produce energy tree 420. All or some of the pixels for which the energy has been computed may be considered a candidate for energy tree 420. To construct energy tree 420, each candidate pixel is set to point to its nearest positional neighbor of higher energy. If multiple positional neighbors of higher energy are an identical Euclidean distance from the candidate pixel, then the pixel may be set to point to its nearest neighbor of highest energy. Thus, all of the pixels of energy tree 420 are set to point to a nearby pixel of higher energy. One pixel, of the highest energy within the digital image, will not point to any other pixel, and will be the root of energy tree 420.

Energy tree 420 may then be pruned, at step 403, to produce initial segmentation map 120. Energy tree 420 may be pruned by breaking all links between pixels that are greater than a threshold Euclidean distance from one another. Thus, pixels having no higher energy pixels within the threshold Euclidean distance will no longer point to a higher energy pixel. These pixels, of locally high energy, will each represent the root of a smaller tree, and energy tree 420 will be broken up into a forest. The number of trees in this forest may depend on the threshold Euclidean distance, which may be predetermined or dynamically determined based on image characteristics. The pixels of each individually-pruned tree may now be outputted as segments of initial segmentation map 120.

Energy tree 420 may also be pruned as it is generated, during step 402. For example, if a candidate pixel's nearest higher energy neighbor has a positional distance from the candidate pixel higher than a maximum Euclidean distance, no link is formed. In this method, energy tree 420 may be generated as a collection of individual trees. Energy tree 420 may then be pruned at step 403 using a threshold Euclidean distance smaller than the maximum Euclidean distance used during the tree's generation. The pruning step may also be omitted entirely, and the pixels of each individual tree of energy tree 420 may be outputted as segments of initial segmentation map 120.

Returning to FIG. 1, at step 104, the initial segmentation map may be used as an input to a connected component analysis, to be performed using boundary preserving distance metric $d_{BP}$. A connected component analysis may be used to merge small segments into larger segments.

Figure 5:
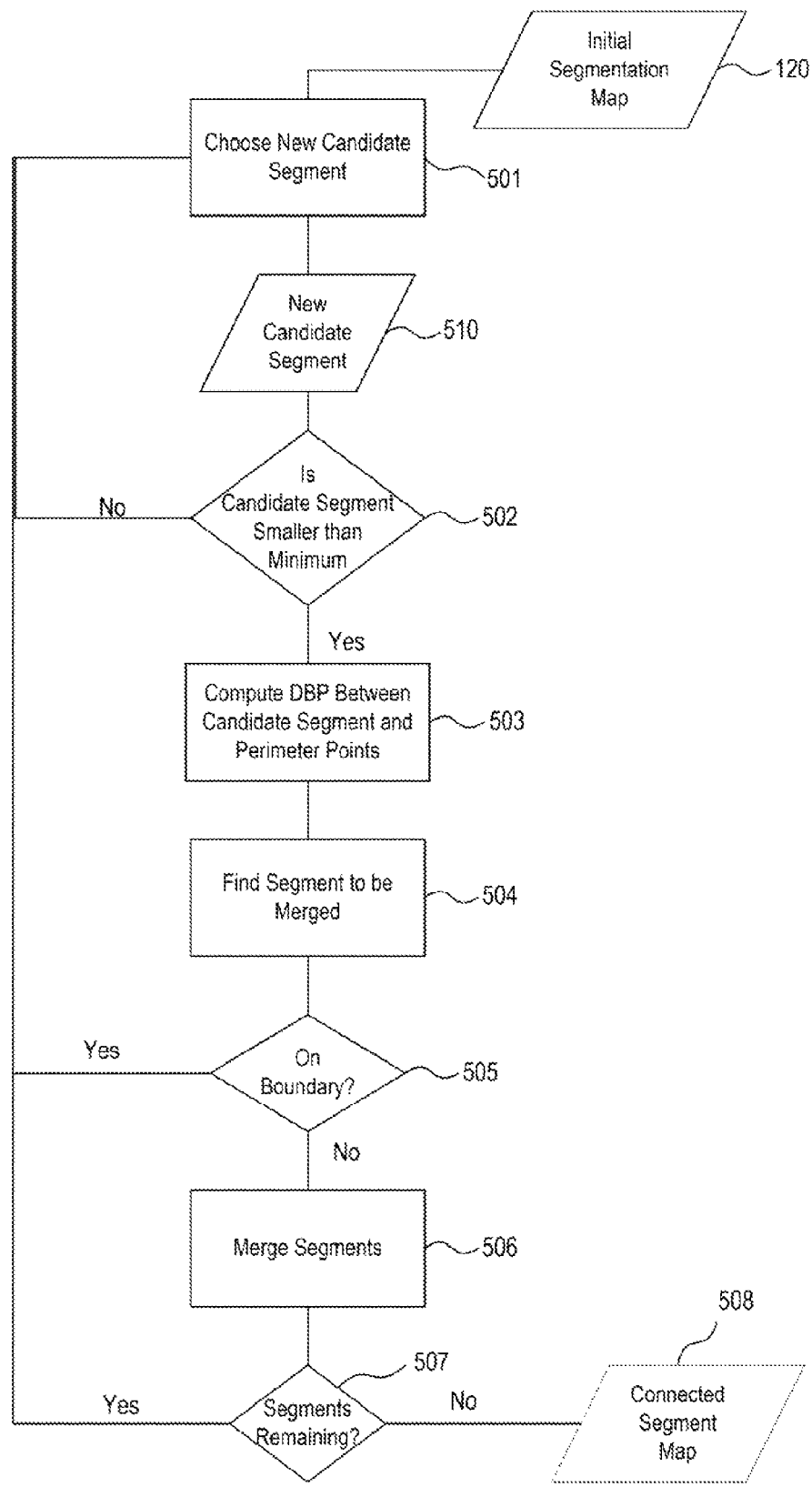
FIG. 5 is a flowchart showing the steps of an exemplary connected component analysis method using a boundary preserving distance metric for merging image segments.

FIG. 5 is a flowchart showing the steps of an exemplary connected component analysis method performed using the boundary preserving distance metric $d_{BP}$. The steps of the exemplary connected component analysis method are to be performed for all or some of the segments of the initial segmentation map.

First, at step 501, a candidate segment $S_i$ 510 is chosen. New candidate segments $S_i$ 510 may be chosen from the segments of initial segmentation map 120 in any order. The order of choosing new candidate segments may be random or predetermined. The order of choosing new candidate segments may also be dynamically determined based on image characteristics. The order of choosing new candidate segments may further be selected, to optimize the results of the connected component analysis method.

At step 502, the size of a candidate segment $S_i$ 510 is compared to a minimum segment size. If the candidate segment $S_i$ 510 is larger than the minimum size, no further processing will be performed on that segment, and a new candidate $S_i$ segment 510 will be chosen. If the candidate segment is smaller than the minimum segment size, the candidate segment $S_i$ 510 will be processed for segment merging, beginning at step 503. The minimum segment size may be predetermined, or may be dynamically determined based on image characteristics.

At step 503, $D_{BP}$ is computed between the candidate segment $S_i$ 510 and each of its perimeter pixels in adjacent segments. $D_{BP}$ between Segment $S_i$ 510 and a perimeter pixel is defined as the minimum boundary preserving distance $d_{BP}$ between any pixel in the candidate segment $S_i$ 510 and the perimeter pixel. For each perimeter pixel that borders the candidate segment $S_i$ 510, the minimum boundary preserving distance $d_{BP}$ between it and one of the pixels within the candidate segment $S_i$ is determined.

At step 504, the computed $D_{BP}$ values of the perimeter pixels are used to determine a segment to be merged $S_{dst}$. First, the minimum $D_{BP}$ value among the perimeter pixels is computed. Then, the segment to be merged $S_{dst}$ may be determined as the segment adjacent to the candidate segment $S_i$ 510 that contains the largest number of pixels having the minimum $D_{BP}$ value.

At step 505, it is determined whether or not there is a strong boundary between the segment to be merged $S_{dst}$ and the candidate segment $S_i$ 510. Step 505 is performed by determining whether or not any of the pixels within $S_{dst}$ having the minimum $D_{BP}$ value from step 503 are on a strong boundary within the digital image 100. If any of the pixels within $S_{dst}$ having the minimum $D_{BP}$ value from step 503 are on a strong boundary, segments $S_i$ 510 and $S_{dst}$ will not be merged, and a new candidate segment $S_i$ 510 will be chosen at step 501. If none of the pixels within $S_{dst}$ having the minimum $D_{BP}$ value from step 503 are on a strong boundary, segments $S_i$ 510 and $S_{dst}$ will be merged, at step 506. As previously described, a strong boundary may be defined as any collection of pixels having boundary probability values greater than a predetermined or dynamically determined threshold.

At step 507, it is determined whether or not any segments of initial segmentation map 120 have yet to be processed. If any segments remain, steps 501-506 may be repeated until all segments have been processed. Merged segments that result from step 506 may be reprocessed. Steps 501-506 may continue until all remaining segments are either larger than the minimum segment size or have been found to have a to be merged segment $S_{dst}$ on a strong boundary at step 505.

The exemplary connected component analysis method shown in FIG. 5 may be used to merge similar segments of initial segmentation map 120. By using the boundary preserving distance metric $d_{BP}$ and the no boundary condition at step 505, small segments with boundaries will remain while other small segments may be merged into larger segments.

Returning to FIG. 1, at step 105 connected segmentation map 130 may be filtered to produce filtered segmentation map 140. Filtering the connected segmentation map 130 serves to reduce noise and smooth the edges of the segments. Any suitable filtering method may be applied to produce smoother boundaries between segments. One such suitable filtering method is median filtering.

The filtered segmentation map 140 may then be made more uniform at segment splitting step 106. In splitting step 106, large segments over a maximum segment size may be continuously divided into two smaller segments until there are no segments larger than the maximum segment size. The result of splitting step 106 is superpixel segmentation map 150, which is then output for use in further image processing tasks. The maximum segment size may be predetermined or may be dynamically determined based on image characteristics.

It will be recognized by one of skill in the art that an exemplary superpixel segmentation method, as disclosed herein, may be modified in various ways to achieve optimal results. Optimal results may include higher computational efficiency, higher segmentation accuracy, and/or higher superpixel compactness. Modifications of the exemplary superpixel segmentation method may include adjustments to predetermined threshold, size, minimum, and maximum values. Modifications may include dynamic or adaptive determinations of threshold, size, minimum, and maximum values. Modifications may further include alternate methods of performing initial segmentation, connected component analysis, filtering, and/or segment splitting.

Figure 6:
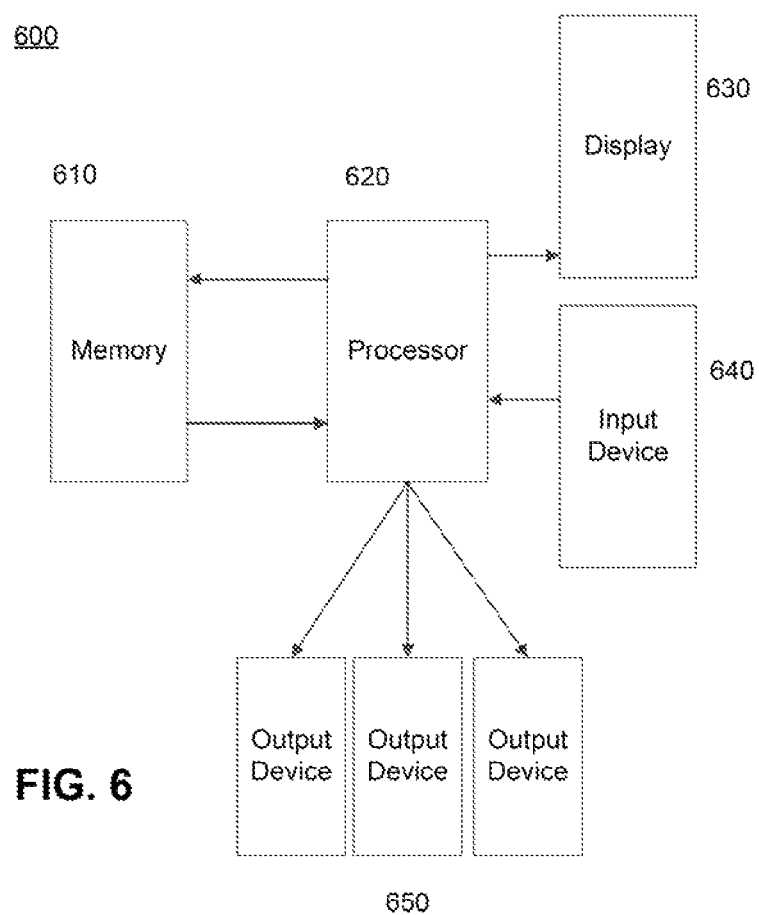
FIG. 6 shows an exemplary system for implementing the disclosed methods and techniques.

FIG. 6 shows an exemplary system 600 for implementing the disclosed methods and techniques. The methods described herein may be implemented or carried out, for example, by a system comprising a memory 610, a processor 620, and a display 630, operatively connected to one another by a wired or wireless connection. Images and data sets described herein may be stored in memory 610. Memory 610 may comprise any storage device capable of storing data processed by processor 620. Memory 610 may be, for example, a floppy disk, CD, DVD, or other magnetic medium, or RAM. Processing steps may be carried out by processor 620 implementing processing components. Processor 620 may be any commonly available digital processor or may be a special purpose digital processor. Software comprising instructions to perform the steps described herein or implement the system components described herein may be stored on a tangible memory, such as memory 610, or a computer-readable tangible medium, such as a DVD or CD. Results of the disclosed methods and techniques may be displayed on a computer display 630. A user input device, such as a keyboard 640, may be provided to permit user interaction. Additional output devices 650, such as a printer, may also be provided. In some embodiments, some or all of the components of system 600 may be located remotely from one another. For example, processor 620 and/or memory 610 may be located in the cloud, and accessed by the user via a wireless connection, such as the Internet.

Embodiments of the methods disclosed herein may be implemented as a computer program product, i.e., a computer program comprising instructions tangibly embodied on an information carrier, e.g., in a machine-readable storage device, or a tangible computer-readable medium, which when executed for execution control the operation of one or more computers, processors, or logic to perform the steps of the method. A computer program can be written in any form of programming language, including compiled or interpreted languages, and it can be deployed in any form, including as a standalone program or as one or more modules, components, subroutines, or other unit suitable for use in a computing environment. A computer program can be deployed to be executed on one computer or on multiple computers at one site or distributed across multiple sites and interconnected by a communication network.

Superpixel segmentation techniques disclosed herein may provide means of increasing the efficacy and the efficiency of subsequent image analysis tasks, such as feature extraction techniques. Techniques disclosed herein may also be used with no additional methods for performing a variety of image classification tasks.

From the foregoing description, it will be appreciated that the present invention provides a method and apparatus for the efficient and accurate segmentation of a digital image. The proposed superpixel segmentation method using a boundary preserving distance metric may be generalized to all types of digital images.

The foregoing methods and systems have been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

From the foregoing description, it will be appreciated that the methods and apparatus described herein to segment digital images may be adapted to classify any digital images having characteristics suitable to these techniques, such as high texture, high image resolution, non-uniformly distributed texture pattern, and densely structured segments. Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented image analysis method of generating a superpixel segmentation of a digitized image, the method to be performed by a system comprising at least one processor and at least one memory, the method comprising:
   determining by the system a probabilistic boundary map of the digitized image;
   calculating by the system a boundary preserving distance metric between at least one of a plurality of pixels of the digitized image and a neighboring plurality of pixels surrounding the at least one of the plurality of pixels;
   segmenting by the system the plurality of pixels based on the calculated boundary preserving distance metric;
   generating by the system a plurality of superpixels based on the segmented plurality of pixels; and
   outputting by the system the generated superpixels for performing additional digital analysis.

2. The computer-implemented image analysis method of claim 1, further comprising:
   performing by the system a connected component analysis of the segments of the digitized image using the boundary preserving distance metric; and
   merging by the system neighboring segments based on results of the connected component analysis.

3. The computer-implemented image analysis method of claim 2, wherein performing a connected component analysis further comprises:
   computing a composite boundary preserving distance metric between a candidate segment and at least one perimeter point in at least one neighboring segment,
   wherein the composite boundary preserving distance metric is a minimum of the boundary preserving distance metrics computed between at least one pixel of the candidate segment and the at least one perimeter point, and
   wherein the neighboring segment to be merged contains a maximum number of pixels having a minimum composite boundary preserving distance metric; and
   wherein merging neighboring segments further comprises:
   determining whether a strong boundary exists between the candidate segment and the neighboring segment to be merged; and
   merging the candidate segment and the neighboring segment to be merged if no strong boundary exists between the candidate segment and the neighboring segment to be merged.

4. The computer-implemented image analysis method of claim 1, wherein the boundary preserving distance metric is determined based on a Euclidean distance, a Bhattacharyya distance, and a boundary crossing probability between two pixels.

5. The computer-implemented image analysis method of claim 4, further comprising measuring the Bhattarachya distance between two pixels based on an adaptive region size determination.

6. The computer-implemented image analysis method of claim 1, wherein segmenting the plurality of pixels further comprises using a quick shift image segmentation algorithm with the boundary preserving distance metric.

7. The computer-implemented image analysis method of claim 1, wherein segmenting the plurality of pixels further comprises:
   smoothing the boundaries of the segmented plurality of pixels; and
   splitting the segmented plurality of pixels.

8. A system for generating a superpixel segmentation of a digitized image comprising:
   a memory having program instructions and data storage space;
   a processor configured to use the program instructions to perform the steps of:
   determining a probabilistic boundary map of the digitized image;
   calculating a boundary preserving distance metric between at least one of a plurality of pixels of the digitized image and a neighboring plurality of pixels surrounding the at least one of the plurality of pixels;
   segmenting the plurality of pixels based on the calculated boundary preserving distance metric;
   generating a plurality of superpixels based on the segmented plurality of pixels; and
   outputting the generated superpixels for performing additional digital analysis.

9. The system of claim 8, wherein the processor is further configured to use program instructions to perform the steps of:
   performing a connected component analysis of the segments of the digitized image using the boundary preserving distance metric; and
   merging neighboring segments based on results of the connected component analysis.

10. The system of claim 9, wherein the performing a connected component analysis further comprises:

computing a composite boundary preserving distance metric between a candidate segment and at least one perimeter point in at least one neighboring segment, wherein the composite boundary preserving distance metric is a minimum of the boundary preserving distance metrics computed between at least one pixel of the candidate segment and the at least one perimeter point, and wherein the neighboring segment to be merged contains a maximum number of pixels having a minimum composite boundary preserving distance metric; and wherein merging neighboring segments further comprises:

determining whether a strong boundary exists between the candidate segment and the neighboring segment to be merged; and merging the candidate segment and the neighboring segment to be merged if no strong boundary exists between the candidate segment and the neighboring segment to be merged.

11. The system of claim 8, wherein the boundary preserving distance metric is determined based on a Euclidean distance, a Bhattacharyya distance, and a boundary crossing probability between two pixels.

12. The system of claim 11, wherein the processor is further configured to use the program instructions to perform the step measuring the Bhattarachya distance between two pixels based on an adaptive region size determination.

13. The system of claim 8, wherein segmenting the plurality of pixels further comprises using a quick shift image segmentation algorithm with the boundary preserving distance metric.

14. The system of claim 8, wherein segmenting the plurality of pixels further comprises:

smoothing the boundaries of the segmented plurality of pixels; and splitting the segmented plurality of pixels.

15. A computer-implemented image analysis method of generating a superpixel segmentation of a digitized image, the method to be performed by a system comprising at least one processor and at least one memory, the method comprising:

determining by the system a probabilistic boundary map of the digitized image;

calculating by the system a boundary preserving distance metric between at least one of a plurality of pixels of the digitized image and a neighboring plurality of pixels surrounding the at least one of the plurality of pixels;

segmenting by the system the plurality of pixels based on the calculated boundary preserving distance metric;

performing by the system a connected component analysis of the segments of the digitized image using the boundary preserving distance metric, wherein performing a connected component analysis further comprises: computing a composite boundary preserving distance metric between a candidate segment and at least one perimeter point in at least one neighboring segment, wherein the composite boundary preserving distance metric is a minimum of the boundary preserving distance metrics computed between at least one pixel of the candidate segment and the at least one perimeter point;

generating by the system a plurality of superpixels based on the segmented plurality of pixels; and outputting by the system the generated superpixels for performing additional digital analysis.

* * * * *